Dec. 16, 1930.  G. C. JETT  1,785,124
HAULING UNIT
Filed April 7, 1928  3 Sheets-Sheet 1
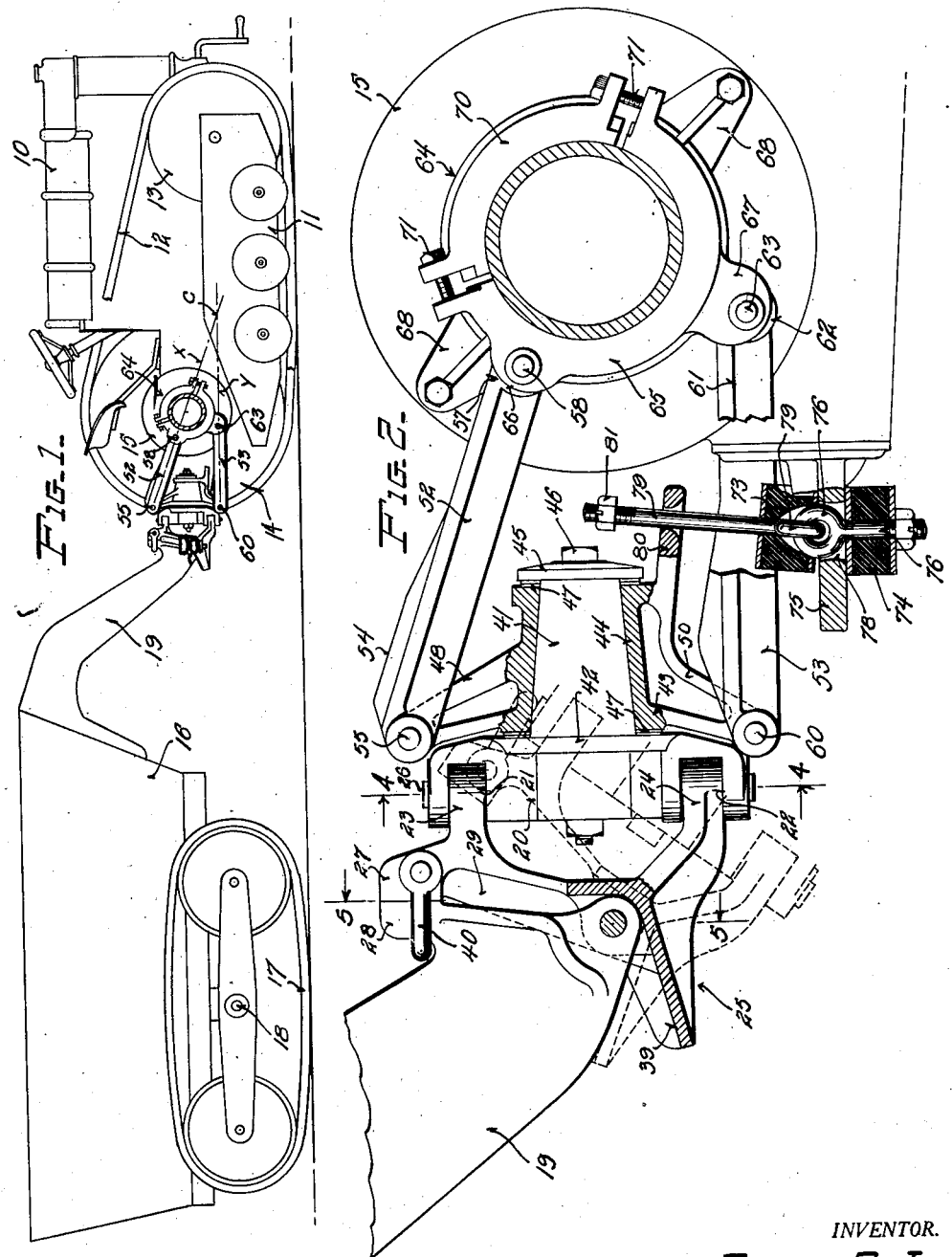
INVENTOR.
GEORGE C. JETT
BY
ATTORNEY.

Dec. 16, 1930.  G. C. JETT  1,785,124
HAULING UNIT
Filed April 7, 1928  3 Sheets-Sheet 2

INVENTOR.
GEORGE C. JETT
BY
ATTORNEY.

Dec. 16, 1930.　　　　G. C. JETT　　　　1,785,124
HAULING UNIT
Filed April 7, 1928　　　3 Sheets-Sheet 3
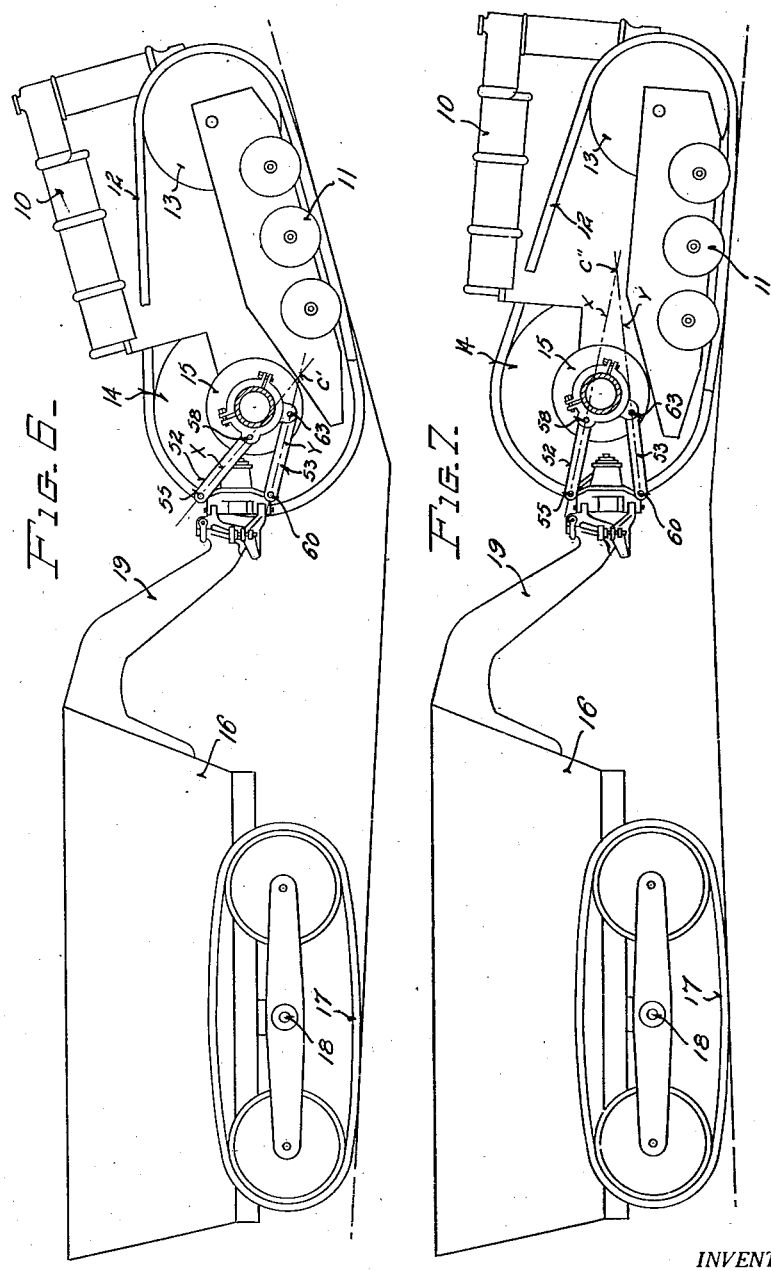
INVENTOR.
GEORGE C. JETT
BY
ATTORNEY.

Patented Dec. 16, 1930

1,785,124

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

HAULING UNIT

Application filed April 7, 1928. Serial No. 268,119.

This invention relates to motor driven hauling units of the crawler tread type for use primarily in transporting heavy loads over soft and uneven ground. Such units are particularly useful for hauling dirt and other loose materials in excavating or ground filling operations and in the construction and repair of dikes, levees, etc.

A general aim of the present invention is the provision of a releasably coupled tractor-trailer unit of extremely flexible, compact, and well-balanced design, capable of easy and safe maneuvering under full load and under most unfavorable ground conditions. To this end the tractor and trailer are so connected that a portion of the trailer load is transmitted to and sustained by the tractor to increase the carrying capacity of the unit and to increase the tractive ability of the tractor, the connection being such as to distribute the transmitted load over the tractor tread mechanism and to permit free longitudinal and transverse oscillation of the tractor relative to the trailer in accordance with fluctuations in the ground contour and to permit the tractor to swing horizontally for steering purposes.

A more specific object of the present invention is the provision of a trailer hitch for a tractor-trailer unit through which a portion of the trailer load may be transmitted to and distributed over the tractor tread mechanism without impairing the freedom of tractor oscillation required for rough ground travel and for good steering.

Another object is the provision of a trailer hitch having the above characteristics which may be readily applied to commercial forms of tractor without necessitating material changes in the structural design thereof.

Another object is the provision of a load sustaining trailer hitch for application to the rear of a tractor and through which the load is transmitted to and distributed lengthwise of the tractor tread.

Another object is the provision of a readily separable load sustaining trailer hitch possessing the above mentioned characteristics.

Other objects and advantages will appear from the following description of an illustrative embodiment of the present invention.

In the drawings:—

Figure 1 is a side elevation of a tractor-trailer unit embodying the present invention.

Fig. 2 is a view in side elevation, partly in section, of the trailer hitch shown in Fig. 1, but on a somewhat larger scale.

Figs. 6 and 7 are views similar to Fig. 1 showing the condition of the hitch in different oscillatory positions of the tractor.

Figure 3:
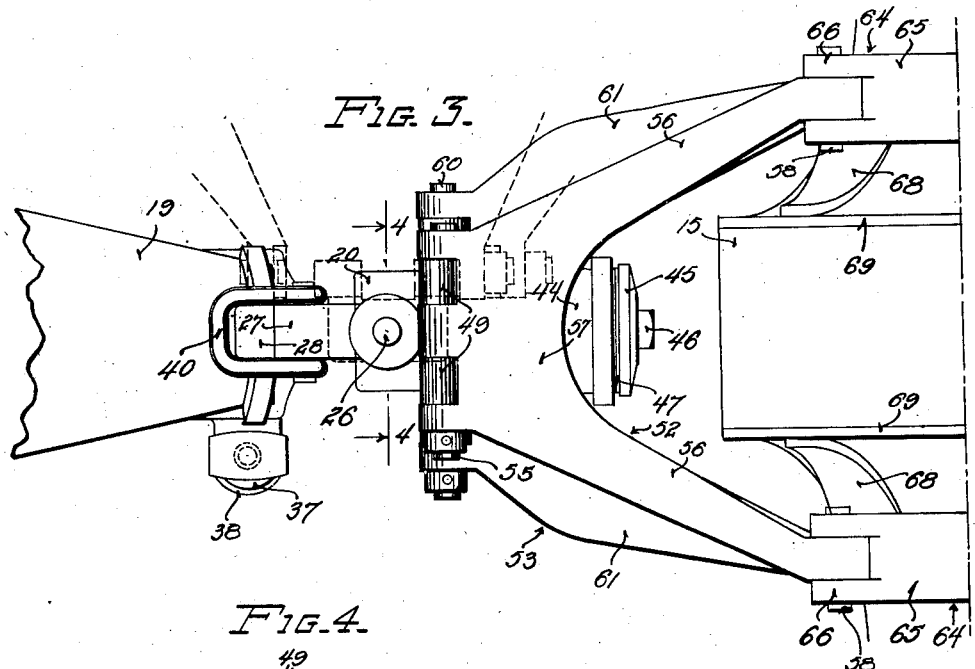
Fig. 3 is a top plan view of the hitch shown in Fig. 2.
Figure 4:
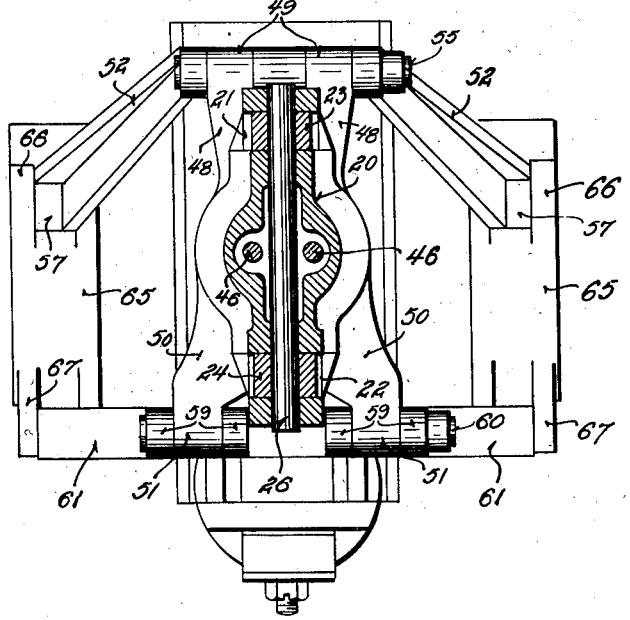
Fig. 4 is a sectional view taken substantially along the line 4—4 of Figs. 2 and 3.
Figure 5:
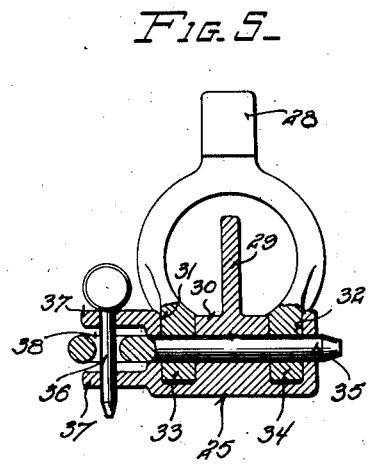
Fig. 5 is a sectional view taken substantially along the line 5—5 of Fig. 2.

The tractor-trailer unit selected for illustration includes a well known type of commercial tractor 10 equipped with a conventional form of crawling tread mechanism 11, including a pair of endless tread belts 12, each trained about a front roller 13 and a rear driving sprocket 14, the two driving sprockets being mounted at the ends of a rear axle housing 15 forming a part of the tractor frame. The trailer shown comprises a body portion 16 rockably supported by and between a pair of appropriate crawler tread mechanisms 17, preferably of the truss chain type, such for instance as described in my copending application, Serial No. 240,141, filed December 15, 1927. The tread mechanisms are in this instance rockably mounted upon the opposite ends of the body supporting axle 18 which is disposed somewhat rearwardly of the center of gravity of the trailer body, so that a portion of the weight of the body and load carried thereby is supported by a tongue 19 projecting forwardly therefrom. The tongue 19 is releasably connected to the tractor through a flexible hitch designed to transmit the unbalanced trailer load to the tractor adjacent the center of gravity thereof so that the load is distributed lengthwise of the tractor tread mechanism. The hitch is also preferably, though not necessarily, designed for application to the rear of the tractor, where it will not interfere with the other parts of the tractor or require any fundamental changes in the design of the tractor chassis.

A trailer hitch having these characteristics is shown in detail in Figures 2 to 5. It comprises a central casting having a vertically extended portion 20 formed adjacent the upper and lower ends thereof with appropriate recesses 21 and 22 for snugly receiving ears 23 and 24, respectively, of a tongue receiving hanger 25. A vertical pin 26 fixed in the portion 20 and passing through the ears 23 and 24 provides a vertically rigid hinge connection between the casting and hanger. The hanger 25 is suitably fashioned to receive the forward end of the trailer tongue 19 and in this instance is formed with a thrust sustaining lug 27 adapted to abut a corresponding lug 28 formed on the end of the tongue. The hanger is also preferably formed with a centrally disposed vertical reinforcing web 29 which merges at the upper end in the lug 27 and at the lower end in a transversely extended thickened portion 30, portion 30 being recessed as at 31 and 32 to receive a pair of laterally spaced ears 33 and 34, respectively, formed on the end of the tongue. A pin 35, projected through the thickened portion 30 and the ears 33 and 34, provides a horizontally rigid hinge connection between the hanger 25 and the end of the tongue. The pin 35 is retained in the position shown by any appropriate means such as a locking pin 36 projectable through and supported by a pair of ears 37 formed on the hanger and through an eye 38 formed on the end of the pin. An apron 39 projecting from the hanger serves to guide the ears 33 and 34 of the tongue into the recesses 31 and 32 during assembly of the tongue and hanger and to limit the hinge action between the tongue and hanger about the pin 35. Any appropriate means such as a link 40, hinged on the lug 27 and adapted to embrace the lug 28 on the tongue, may be provided to lock the tongue and hanger together when desired. The link 40 may however be swung upwardly and forwardly out of engagement with the lug 28 to permit the hinge action about the pin when the tractor-trailer unit is used on very uneven ground.

The central casting is also formed with an integral stud or pintle 41 which projects horizontally from the center of a substantially circular face plate 42 formed upon the side of the portion 20 intermediate the ends thereof. The pintle forms a support for a spider 43 having a central hub portion 44 longitudinally bored and closely fitted for rotation upon the pintle. An end cap 45, fixed to the end of the pintle by a pair of tension bolts 46 extending longitudinally therethrough, serves as a convenient means for retaining the hub 44 on the pintle. The pintle is preferably tapered as indicated, and spacer washers 47 are preferably provided between the ends of the hub and the face plate 42 and end cap 45 to hold the hub against end play and to compensate for wear. The spider 43 is formed with a pair of rigid upright arms 48 terminating in ears 49, and with a pair of rigid depending arms 50 terminating in ears 51. Arms 48 are flexibly connected to the tractor chassis through a longitudinally rigid link structure 52, and arms 50 are similarly connected to the tractor chassis through a longitudinally rigid link structure 53. Link structure 52 comprises a body portion 54, recessed to receive the ears 49 and to which it is hingedly connected by a pivot pin 55, and a pair of divergent leg portions 56 which terminate in ears 57 perforated to receive axially aligned hinge pins 58, fixed with respect to the tractor chassis. Link structure 53 is quite similar to structure 52. It is provided at one end with lugs 59 recessed to receive the ears 51 of arms 50 to which they are hingedly connected by pivot pins 60, and it also includes similar divergent leg portions 61 which terminate in ears 62 perforated to receive axially aligned hinge pins 63, fixed with respect to the tractor chassis.

Although the pins 58 and 63 may be fixed to the tractor chassis in various ways, they are shown anchored in appropriate brackets 64 removably fixed to the rear axle housing 15. In this instance each bracket is in the form of a clamp ring, one part 65 of which is formed with a pair of bearing lugs 66 and 67 for the pins 60 and 63 and with a pair of anchor lugs 68 adapted to be bolted to the differential housing 69, while the other part 70 merely coacts with part 65 to embrace and firmly grip the axle housing, appropriate clamp screws 71 being provided for the purpose.

From the foregoing it will be noted that with the parts assembled as indicated, the hanger 25, central casting 20, and spider 43 together constitute a vertically rigid extension of the trailer tongue 19, although the spider 43 is free to rock about the horizontal axis of the pintle 41, to thereby permit free transverse oscillation of the tractor relative to the trailer, and the spider and casting 20 are free to swing about the vertical pin 26, to thereby permit free turning of the tractor to left or right for steering purposes. It will also be noted that the two link structures 52 and 53 are non-parallel, and more particularly that pins 55 and 60 at the rear ends of these structures are vertically spaced a greater distance than the pins 58 and 63 at the forward ends thereof, so that, as the spider 43 is urged downwardly by the unbalanced trailer load on the tongue 19, pin 55 is urged toward the pin 58 and pin 60 is urged away from pin 63. Link structure 52 is thus placed under compression and structure 53 under tension and the two coact to support the spider, and consequently the tongue, against downward displacement under the unbalanced trailer load. The resultant thrust of link structure 52 against pins 58 together with the pull of structure 53 upon pins 63 results in the application of a force couple to the tractor chassis which tends to tilt the tractor forwardly, or, in other words, to force the forward end of the tractor down. From the foregoing it is clear that although the trailer hitch is actually applied to the rear end of the tractor, the unbalanced trailer load on the tongue is transmitted through the tongue and hitch to the tractor and applied to the tractor at a theoretical point intermediate the ends thereof.

Best results are obtained when the transmitted load is applied to the tractor at a point coincident with or adjacent the center of gravity thereof to avoid destroying the original balance of the tractor and to effect a substantially uniform distribution of the transmitted load over the tractor treads. To accomplish this the several pins 55, 58, 60, and 63 are so disposed that lines $x$ and $y$ projected through pins 55 and 58 and pins 60 and 63, respectively, will intersect at a point $c$ coincident with or adjacent the center of gravity. (See Fig. 1.) Since lines $x$ and $y$ represent the directions of the compressive and tensile stresses in the link structures 52 and 53, respectively, it may be readily proven that point $c$ represents the point of application of the transmitted load to the tractor. In fact, if the two link structures were actually extended to the point $c$ and hingedly attached to the tractor chassis at that point, instead of at the separate points 58 and 63, they would function to transmit and apply the load in much the same manner.

It will also be noted that with the link structures 52 and 53 constructed and arranged as indicated, the tractor is free to rock longitudinally to accommodate itself to variations in ground contour. Thus in Figure 6 the tractor has assumed a rearward tilt and in Figure 7 a forward tilt. It will be noted that with the tractor in the position of Figure 6, the lines $x$ and $y$ intersect at a new point $c'$ somewhat below and rearwardly of the point $c$ of Figure 1, and that in the position assumed in Figure 7 these lines intersect at another point $c''$ somewhat above and forwardly of point $c$. The point of application of the load thus assumes new positions during this longitudinal oscillation of the tractor, but in all positions of the tractor this point is far enough forward so that a part of the load is actually applied to the forward portions of the crawler treads.

Provision is also preferably made for limiting the lengthwise oscillation of the tractor. In this instance two resilient bumper blocks 73 and 74 are applied above and beneath a plate 75 which projects rearwardly from the tractor chassis. (See Fig. 2.) The lower block 74 is supported by a short eye bolt 76 anchored therein and having a head 77 seated over an opening 78 in the plate. Bolt 76 is flexibly interlocked with a second eye bolt 79 which passes up through the upper block 73 and through an appropriate bracket 80 projecting forwardly from the spider 43. A nut 81 on bolt 79 limits the downward travel of the bolt through the bracket. The arrangement is such that as the tractor tilts rearwardly the plate 75 moves down until the nut 81 strikes the bracket 80 thereby placing the bolts 79 and 76 under tension and preventing any further depressions of plate 75. The lower resilient block 74 serves as a shock absorber when this limit of action is reached. As the tractor tilts forwardly plate 75 rises until arrested by the engagement of the upper resilient block 73 with the bracket 80.

When traveling over very uneven ground a further forward tilting of the trailer is permitted by swinging the link 40 from locking engagement with the lug 28 into the dotted line position shown in Figure 2, in which position the hanger 25 is free to rock forwardly about the pin 35, as indicated in dotted lines in Figure 2, as the tractor continues a forward tilting action beyond the limit normally established by the engagement of block 73 against bracket 80. This forward rocking action of the hanger is limited by the engagement of the apron 39 against the bottom of the tongue.

From an inspection of Figures 1, 2 and 3 it will be noted that the vertical pin 26 is so positioned as to permit the tractor to be turned through a very wide angle and that the tractor-trailer unit may thus execute very sharp turns. Thus as indicated in dotted lines in Figure 3 the structure forwardly of the pin 26 is free to swing through an angle of almost ninety degrees from the normal so that the tractor is capable of executing an approximate right angle turn. The tongue 19 is preferably of arched form in order to clear the driving sprockets of the tractor when making sharp turns.

Various changes may be made in the embodiment of the invention herein above described without departing from or sacrificing the advantages of the invention as defined in the appended claims.

I claim:—

1. A hauling unit comprising a tractor, a crawler tread therefor, a trailer having a body for receiving and transporting loose materials, and a load sustaining draft mechanism therebetween attached to one end of said tractor, said draft mechanism including a member for oscillation about a longitudinal horizontal axis, and means coacting with said tractor and trailer to transmit and apply a portion of the trailer load to said tractor at a point forwardly of the point of attachment of said mechanism to said tractor to thereby distribute said load over said crawler tread.

2. A hauling unit comprising a tractor, a crawler tread therefor, a trailer having a body for receiving and transporting loose materials, and a load transmitting draft connection therebetween for sustaining a portion of the trailer load, said connection including a member for oscillation about a longitudinal horizontal axis, and means reacting under the transmitted load to apply a force couple to said tractor tending to tilt the same forwardly to thereby distribute said load over said crawler tread.

3. A hauling unit comprising a tractor, a crawler tread therefor a trailer having a body for receiving and transporting loose materials, and a load transmitting draft connection therebetween, said connection including a member for oscillation about a longitudinal horizontal axis, a pair of link structures hingedly connected to said tractor and reacting under the transmitted load to apply a force couple to said tractor tending to tilt the same forwardly to thereby distribute said load over said crawler tread.

4. A hauling unit comprising a tractor, a trailer, and a load transmitting draft connection therebetween, said connection including a member hingedly connected with said trailer to swing about a vertical axis, a second member rockably mounted on said first named member to oscillate about a horizontal axis, and a pair of nonparallel link structures each rockably connected at one end with said last named member, and rockably connected at the other end with said tractor.

5. A trailer hitch for tractors comprising a pair of non-parallel links, connected with the tractor to swing about spaced horizontal axes, a member, spaced horizontal hinge connections between said member and links, a support for said member permitting the same to rock about a horizontal axis, a hanger for application to a trailer, and a vertically rigid hinge connection between said hanger and support.

6. The combination with a trailer having a tongue, and a tractor, of a separable draft mechanism therebetween, said mechanism including a hanger for application to the end of said tongue, a releasable pin connecting said hanger and tongue, a member hingedly connected with said hanger to rock about a substantially vertical axis, a second member rockably supported on said first named member to oscillate about a substantially horizontal axis, a pair of link structures hingedly connected to said last named member to swing about spaced horizontal axes, and spaced horizontal hinge connections between said structures and said tractor.

7. In a hauling unit the combination of a tractor, a trailer, a pair of vertically spaced link structures, each structure having a body portion and a pair of forwardly divergent leg portions, horizontal hinge connections between the leg portions of each structure and said tractor, a member, a horizontal hinge connection between the body portion of each structure and said member, and a separable load sustaining connection between said member and said trailer.

8. In a hauling unit the combination of a tractor, a trailer, a pair of vertically spaced link structures, each structure having a body portion and a pair of forwardly divergent leg portions, horizontal hinge connections between the leg portions of each structure and said tractor, a member, a horizontal hinge connection between the body portion of each structure and said member, and means including a vertically rigid hinge connection between said member and trailer.

9. A hauling unit comprising a tractor and trailer, and a load sustaining draft connection therebetween for transmitting and applying a portion of the trailer load to said tractor at a point intermediate the ends thereof, said mechanism including a flexible connection permitting limited longitudinal oscillation of said tractor relative to said trailer, a second hinge connection within said mechanism permitting further longitudinal oscillation of said tractor, and releasable means for restraining the action of said hinge connection.

In witness whereof, I hereunto subscribe my name this 20th day of March, 1928.

GEORGE C. JETT.